(12) United States Patent
Rofougaran et al.

(10) Patent No.: US 8,238,275 B2
(45) Date of Patent: Aug. 7, 2012

(54) IC WITH MMW TRANSCEIVER COMMUNICATIONS

(75) Inventors: Ahmadreza (Reza) Rofougaran, Newport Coast, CA (US); Timothy W. Markison, Lahaina, HI (US)

(73) Assignee: Broadcom Corporation, Irvine, CA (US)

( * ) Notice: Subject to any disclaimer, the term of this patent is extended or adjusted under 35 U.S.C. 154(b) by 733 days.

(21) Appl. No.: 12/202,255

(22) Filed: Aug. 30, 2008

(65) Prior Publication Data

US 2008/0318619 A1 Dec. 25, 2008

Related U.S. Application Data

(63) Continuation-in-part of application No. 12/026,681, filed on Feb. 6, 2008, and a continuation-in-part of application No. 11/700,285, filed on Jan. 31, 2007.

(51) Int. Cl.
*H04B 7/00* (2006.01)

(52) U.S. Cl. ........ 370/310; 370/307; 370/308; 370/309; 370/310.1

(58) Field of Classification Search .................. 370/310, 370/307, 308, 309, 310.1, 277, 379, 382
See application file for complete search history.

(56) References Cited

U.S. PATENT DOCUMENTS

| | | | |
|---|---|---|---|
| 4,807,183 A | 2/1989 | Kung | |
| 5,502,683 A | 3/1996 | Marchioro | |
| 5,754,948 A | 5/1998 | Metze | |
| 5,786,912 A | 7/1998 | Kartalopoulos | |
| 5,809,321 A | 9/1998 | Hansen | |
| 5,884,104 A | 3/1999 | Chase | |
| 6,182,203 B1 | 1/2001 | Simar | |
| 6,234,900 B1 | 5/2001 | Cumbers | |
| 6,438,622 B1 | 8/2002 | Haghighi | |
| 6,500,070 B1 | 12/2002 | Tomizawa et al. | |
| 6,663,295 B2 | 12/2003 | Kami et al. | |
| 6,735,663 B2 | 5/2004 | Watts, Jr. et al. | |
| 6,735,708 B2 | 5/2004 | Watts, Jr. | |
| 6,801,974 B1 | 10/2004 | Watts, Jr. et al. | |
| 6,816,925 B2 | 11/2004 | Watts, Jr. | |

(Continued)

FOREIGN PATENT DOCUMENTS

EP 1499070 A2 1/2005

(Continued)

OTHER PUBLICATIONS

Dr. Lynn Fuller, "Microelectromechanical Systems (MEMs) Applications—Microphones,"Rochester Institute of Technology Microelectronic Engineering, Apr. 25, 2005, pp. 1-43.

(Continued)

*Primary Examiner* — Derrick Ferris
*Assistant Examiner* — Abdelnabi Musa
(74) *Attorney, Agent, or Firm* — Garlick & Markison; Bruce E. Garlick; Jessica W. Smith

(57) ABSTRACT

An integrated circuit (IC) includes a processing module and main memory. The processing module includes a processing core and a first processing module millimeter wave (MMW) transceiver coupled to the processing core. The main memory includes memory and a first memory MMW transceiver coupled to the memory. At least one of an instruction and data is conveyed between the processing core and the memory via the first processing module MMW transceiver and the first memory MMW transceiver.

20 Claims, 9 Drawing Sheets

U.S. PATENT DOCUMENTS

| | | |
|---|---|---|
| 7,065,326 B2 | 6/2006 | Lovberg |
| 7,082,285 B2 | 7/2006 | Linde |
| 7,149,837 B2 | 12/2006 | Watts, Jr. et al. |
| 7,159,099 B2 | 1/2007 | Lucas |
| 7,171,050 B2 | 1/2007 | Kim |
| 7,197,584 B2 | 3/2007 | Huber et al. |
| 7,218,143 B1 | 5/2007 | Young |
| 7,257,093 B1 | 8/2007 | Witzke |
| 7,330,702 B2 | 2/2008 | Chen et al. |
| 7,406,062 B2 | 7/2008 | Hsu |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1 | 5/2002 | Thi |
| 2002/0107010 A1 | 8/2002 | Witte |
| 2002/0164945 A1* | 11/2002 | Olsen et al. .................. 455/3.01 |
| 2003/0001882 A1 | 1/2003 | Macer et al. |
| 2003/0017845 A1 | 1/2003 | Doviak |
| 2003/0040284 A1 | 2/2003 | Sato |
| 2003/0059022 A1 | 3/2003 | Nebiker |
| 2003/0078071 A1 | 4/2003 | Uchiyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1 | 8/2003 | LeCren |
| 2003/0172380 A1 | 9/2003 | Kikinis |
| 2003/0221036 A1* | 11/2003 | Konetski ....................... 710/303 |
| 2004/0054776 A1 | 3/2004 | Klotz |
| 2004/0062308 A1 | 4/2004 | Kamosa |
| 2004/0117442 A1 | 6/2004 | Thielen |
| 2004/0123113 A1 | 6/2004 | Mathiassen et al. |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1 | 2/2006 | Turner |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0190691 A1 | 8/2006 | Chauve |
| 2006/0203758 A1 | 9/2006 | Tee et al. |
| 2006/0252470 A1 | 11/2006 | Seshadri |
| 2006/0260546 A1 | 11/2006 | Usami |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Brockmann |
| 2008/0063236 A1 | 3/2008 | Ikenoue et al. |
| 2008/0070516 A1 | 3/2008 | Lee |
| 2008/0076406 A1 | 3/2008 | Chen |
| 2008/0151847 A1 | 6/2008 | Abujbara |
| 2008/0244148 A1 | 10/2008 | Nix et al. |
| 2009/0006640 A1 | 1/2009 | Brouwer |
| 2009/0198854 A1 | 8/2009 | Rofougaran |
| 2009/0215533 A1 | 8/2009 | Zalewski et al. |
| 2010/0056132 A1 | 3/2010 | Gallagher |
| 2010/0120447 A1 | 5/2010 | Anderson et al. |
| 2010/0146199 A1 | 6/2010 | Shaeffer |
| 2010/0273468 A1 | 10/2010 | Bienas et al. |
| 2011/0134868 A1 | 6/2011 | Lee et al. |

FOREIGN PATENT DOCUMENTS

| | | |
|---|---|---|
| WO | 2009002464 A2 | 12/2008 |

OTHER PUBLICATIONS

Radio Control Adapter; IBM Technical Disclosure Bulletin NN86081337; IBM; Aug. 1986.

Xilinx Inc.: SPARTAN-3AN FPGA Family Data Sheet, DS557, Jun. 2, 2008, pp. 5.

Bruce K Gale, "RF, Electrical, and Magnetic Microsystems," Apr. 16, 2002, 8 pages.

Haworth, et al.; Public Security Screening for Metallic Objects with Millimetre-Wave Images; Heriot-Watt University; United Kingdom; Jun. 7-8, 2005; pp. 1-4.

Elsadek, et al.; "A Compact 3-D Microwave Holographic Pointer System Using a Size Reduced Microstrip Planar Array"; Department of Electrical and Computer Engineering; University of California; Oct. 7-10, 2011; pp. 1-5.

Elsadek, et al.; "Microstrip Multi-element Diversity Antenna Array for Three Dimensional Microwave Holographic Input Pointer (Holo3D)"; Department of Electrical and Computer Engineering; University of California; Aug. 7, 2002, pp. 1-4.

E3 Wii Controller; Nintendo Wilmote; Technology Limitations; Xgaming, Inc.; 2005; pp. 1-5.

* cited by examiner

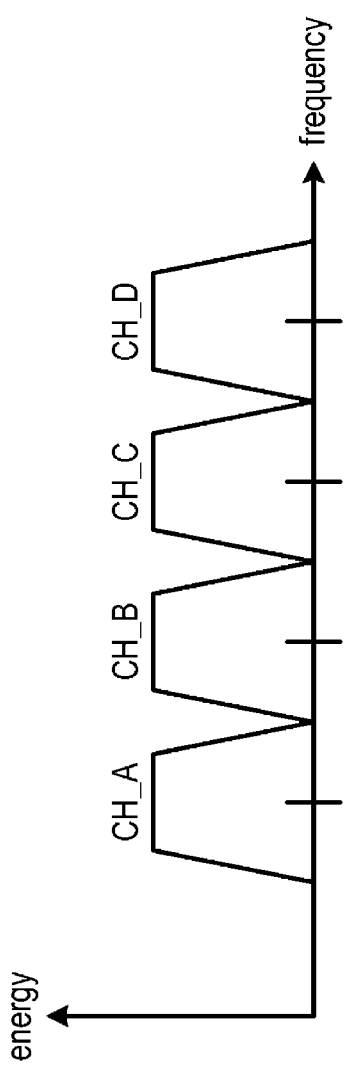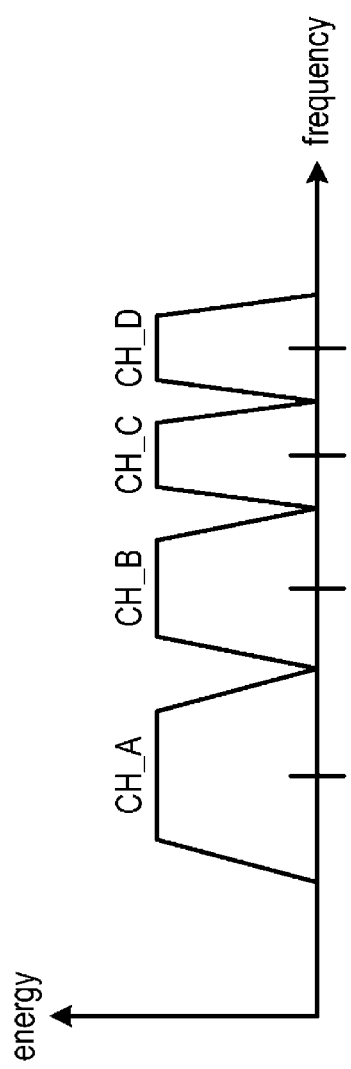

IC WITH MMW TRANSCEIVER COMMUNICATIONS

This patent application is claiming priority under 35 USC §120 as a continuation in part patent application of co-pending patent application entitled COMPUTING DEVICE WITH HANDHELD AND EXTENDED COMPUTING UNITS, having a filing date of Feb. 6, 2008, and a Ser. No. 12/026,681 and of co-pending patent application entitled RF BUS CONTROLLER, having a filing date of Jan. 31, 2007, and a Ser. No. 11/700,285.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing devices and more particularly to components of such computing devices.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

As integrated circuit technology advances, the basic architecture of a processing core, memory, and peripheral devices is increasing in complexity, capabilities, and size reduction. However, communication between these components is done using traces (e.g., on an IC and/or on a PCB), which requires drivers to drive the lines. As is known, the transferring of data via the traces and drivers consumes a significant amount of power, which produces heat. With many central processing unit (CPU) architectures, heat dissipation is a critical issue.

Therefore, a need exists for a computing device IC architecture that reduces power consumption by reducing interconnecting traces and associated driver circuitry.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 4 is a diagram of an example of channel assignments within a frequency band in accordance with the present invention;

FIG. 5 is a diagram of another example of channel assignments within a frequency band in accordance with the present invention;

DETAILED DESCRIPTION OF THE INVENTION

Figure 1:
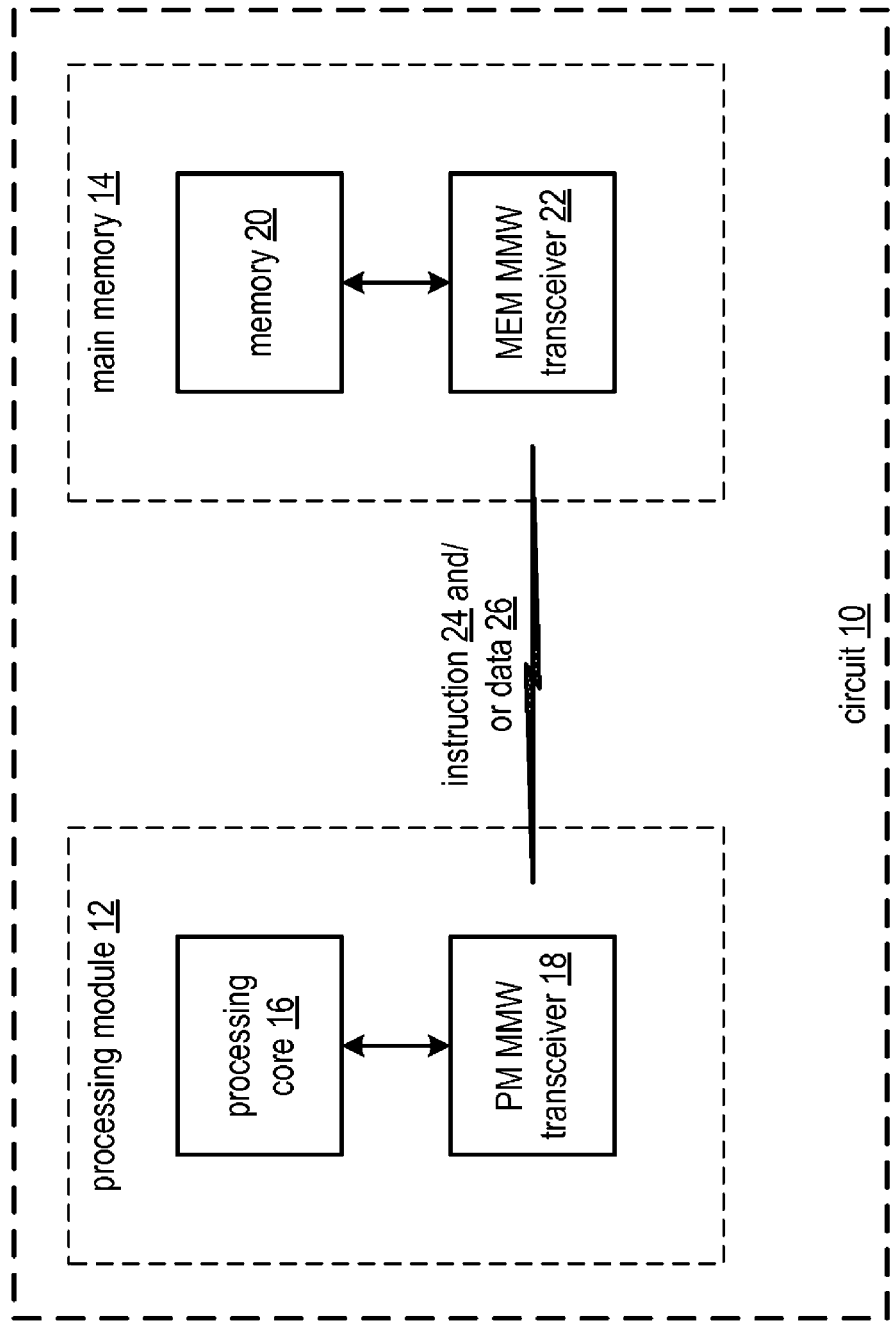
FIG. 1 is a schematic block diagram of an embodiment of an integrated circuit in accordance with the present invention.

FIG. 1 is a schematic block diagram of an embodiment of a circuit 10 that includes a processing module 12 and main memory 14. The circuit 10 may be implemented as single integrated circuit (IC) including the processing module 12 and the main memory 14. Alternatively, the circuit may be implemented as two ICs: one for the processing module 12 and another for the main memory 14.

The processing module 12 includes a processing core 16 and a processing module (PM) millimeter wave (MMW) transceiver 18. The processing core 16 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The main memory 14 includes memory 20 and a memory (MEM) MMW transceiver 22. The memory 20 may be a single memory device or a plurality of memory devices. Such a memory device may be a read-only memory, random access memory, volatile memory, non-volatile memory, static memory, dynamic memory, flash memory, cache memory, and/or any device that temporarily or permanently stores digital data.

Each of the transceivers 18 and 22 include a baseband processing module, a receiver section, and a transmitter section. The transmitter and receiver sections may share one or more antennas or each may have its own one or more antennas. The baseband processing module converts outbound data (e.g., an instruction 26 and/data 28) into an outbound symbol stream in accordance with a data modulation scheme and a channel usage scheme. The data modulation scheme may be binary phase shift keying (BPSK), quadrature phase shift keying (QPSK), frequency shift keying (FSK), minimum shift keying (MSK), amplitude shift keying (ASK), quadrature amplitude modulation (QAM), a combination thereof, and/or variations thereof. The channel usage scheme may be time division multiple access (TDMA), frequency divisional multiple access (FDMA), code division multiple access (CDMA), orthogonal frequency division multiplexing (OFDM), a combination thereof, and/or variations thereof. In addition, the baseband processing module may also utilize a scrambling scheme, an encoding scheme, a data puncture scheme, an interleaving scheme, space-time-frequency encoding, a beamforming scheme, a frequency to time domain conversion, and/or a combination thereof to produce the outbound symbol stream.

The transmitter section converts the outbound symbol stream into an outbound RF signal that has a carrier frequency within a given frequency band (e.g., 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $+/-\Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., $+/-\Delta f$ [frequency shift] and/or $f(t)$ [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., $+/-\Delta A$ [amplitude shift] and/or $A(t)$ [amplitude modulation]) that adjusts the amplitude of the oscillation to produce the outbound RF signal.

The receiver section amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The baseband processing module converts the inbound symbol stream into inbound data (e.g., the instruction 24 and/data 26) in accordance with the data modulation scheme and the channel usage scheme. In addition to demodulating the inbound symbol stream, the baseband processing module may also utilize a descrambling scheme, an decoding scheme, a data de-puncture scheme, a de-interleaving scheme, space-time-frequency decoding, a time to frequency domain conversion, and/or a combination thereof to produce the inbound data.

In operation, the processing core 16 and the memory 20 exchange an instruction 26 and/or data 28 via the MMW transceivers 18 and 22. The instruction 24 may be one of a plurality of operation codes, one or a plurality of assembly language codes, one of a software instruction set, one of a plurality of machine codes, etc. Each instruction 24 may have one or more operands (e.g., data 26) associated therewith, which may be representative of data being manipulated in accordance with the instruction (e.g., write XX to an address of memory), a register vale, a value in a stack, an input/output port, or other piece of information.

As an example, assume that the processing core 16 is executing an algorithm that includes a plurality of instructions 24 and data 26 stored in memory 20. To retrieve an instruction 24 and/or data 26 from the memory 20, the processing core 20 executes a fetch instruction, which identifies the instructions 24 and/or data 26 to be retrieved from memory 20. The PM MMW transceiver 18 converts the fetch instruction into an outbound RF signal that is received as an inbound RF signal by the MEM MMW transceiver 22. The MEM MMW transceiver 22 converts the inbound RF signal into inbound data (e.g., the fetch instruction), which is provided to the memory 20. The memory retrieves the requested instructions 24 and/or data 26 and provides it to the MEM MMW transceiver 22.

The MEM MMW transceiver 22 converts the retrieved instructions 26 and/or data 28 into an outbound RF signal, which is received as an inbound RF signal by the PM MMW transceiver 18. The PM MMW transceiver 18 converts the inbound RF signal into inbound data (e.g., the retrieved instructions 24 and/or data 26) and provides it to the processing core 16. In this manner, instructions 24 and/or data 26 are exchanged via an RF bus structure, which has a carrier frequency in the millimeter wave (MMW) range of 3 GHz to 300 GHz). For a more detailed discussion on an RF bus structure refer to co-pending patent application entitled RF BUS CONTROLLER, having a filing date of Jan. 31, 2007, and a Ser. No. 11/700,285.

As an alternative to RF based transceivers, the transceivers 18 and 22 may be magnetic based. For a discussion of magnetic based transceivers refer to co-pending patent application entitled INDUCTIVELY COUPLED INTEGRATED CIRCUIT AND METHODS FOR USE THEREWITH, having a filing date of Feb. 27, 2008, and a Ser. No. 12/038,260.

Figure 2:
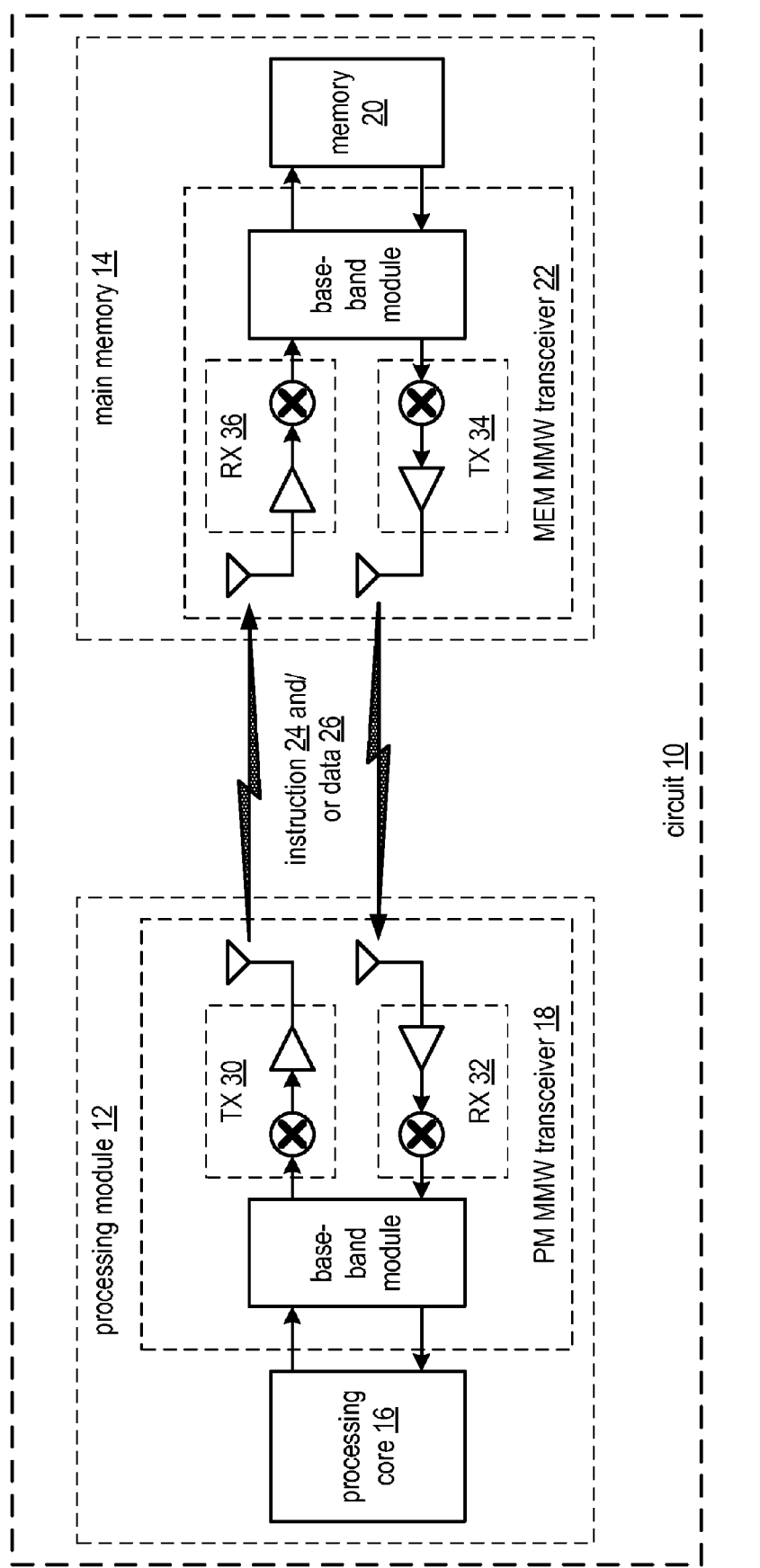
FIG. 2 is a schematic block diagram of another embodiment of an integrated circuit in accordance with the present invention.

FIG. 2 is a schematic block diagram of another embodiment of a circuit 10 that includes the processing module 12 and the main memory 14. The processing module 12 includes a processing core 16 and a processing module (PM) millimeter wave (MMW) transceiver 18. Each of the transceivers 18 and 22 include a baseband processing module 31 & 35, a receiver section 32 & 36, and a transmitter section 30 & 34. The baseband processing modules 31 & 35 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-10.

As shown, the transceivers 30 & 34 include an up-conversion mixing module and a power amplifier coupled to one or more antennas. The receiver sections 32 & 36 include a down conversion mixing module and a low noise amplifier coupled to one or more antennas. In this embodiment, the transmitter section 30 of the processing module MMW transceiver 18 and the receiver section 36 of the memory MMW transceiver section 22 use a first channel of a plurality of channels for conveying an instruction 24 and/or data 26 from the processing core 16 to the memory 20. In addition, the receiver section 32 of the processing module MMW transceiver 18 and the transmitter section 34 of the memory MMW transceiver section 22 use a second channel of the plurality of channels for conveying an instruction 24 and/or data 26 from the memory 20 to the processing core 16. As such, the processing core 16 and the memory 20 can communicate in a full duplex manner.

As a further embodiment, the processing module 12 and the main memory 14 may each further include one or more MMW transceivers to increase the data rate capabilities between the processing core 16 and the memory 20. For instance, if the MMW transceivers operate in the 60 GHz frequency range, they may convey instructions 24 and/or data 26 at a rate of up to 6 giga-bits-per-second (Gbps). If the processing module 12 and the main memory 14 each include eight MMW transceivers, they can convey up to 6 giga-bytes-per-second (GBps). In this example, each MMW transceiver would use a different channel of the plurality of channels.

Figure 3:
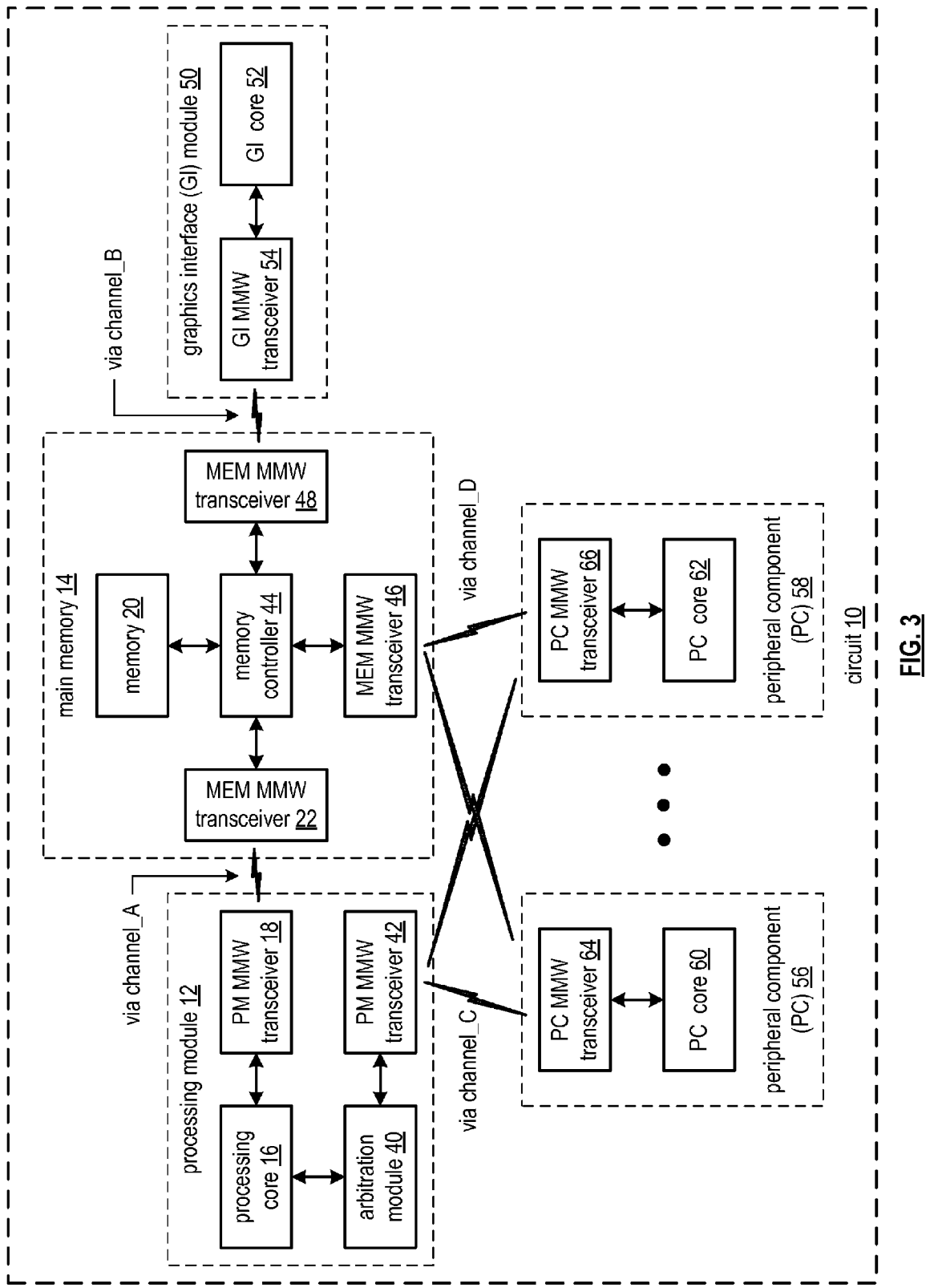
FIG. 3 is a schematic block diagram of another embodiment of an integrated circuit in accordance with the present invention.

FIG. 3 is a schematic block diagram of another embodiment of a circuit 10 that includes the processing module 12 the main memory 14, a graphics interface (GI) module 50, and a plurality of peripheral components (PC) modules 56-58. The circuit 10 may be implemented as single integrated circuit (IC) including the processing module 12, the main memory 14, the graphics interface module 50, and the peripheral components 56-58. Alternatively, the circuit 10 may be implemented via a plurality of ICs: one for the processing module 12, one for the main memory 14, one for the graphics interface module 50, and one each for the peripheral components 56-58. As yet another alternative, the circuit 10 may include a few ICs, where each IC includes one or more of the modules 12, 14, 50, and 56-58.

The processing module 12 includes the processing core 16, first and second processing module (PM) millimeter wave (MMW) transceivers 18 and 42, and an arbitration module 40.

The main memory 14 includes the memory 20, first, second, and third MEM MMW transceivers 22, 48, & 48, and a memory controller 44. The graphics interface module 50 includes a graphics interface core 52 and a graphics interface MMW transceiver 54. Each of the peripheral components 56-58 includes a peripheral component MMW transceiver 64-66 and a peripheral component core 60-62.

The processing module 12 and the main memory 14 exchange instructions 24 and/or data 26 as previously discussed via one or more channels of a plurality of channels (e.g., channel A of channels A-D). In addition, the processing module 12 may convey instructions (e.g., input/output requests, interrupts, service requests, etc.) and/or data with one or more of the peripheral components 56-58. The peripheral components 56-58 may be one or more of input/output interfaces coupled to one or more of a keyboard, a keypad, a touch screen, a mouse, a printer, a disk drive, etc. In addition, the peripheral components 56-58 may be a hard disk interface, a flash memory interface, a disk array controller, a network card interface, a universal serial bus (USB) interface, a wireless local area network (WLAN) interface, a sound card interface, an infrared (IR) transceiver interface, a television tuner interface, a video processing interface, and/or a memory expansion interface.

The peripheral components modules 56-58 will interface with a plurality of off-chip peripheral components (e.g., flash memory, mouse, keyboard, etc.), which share the wireless connectivity to the processing module 12. In this example, channel C is allocated to support the communications between the processing core 16 and the peripheral components. The sharing may be done in a variety of ways. For example, the peripheral component MMW transceivers 64-66 may utilize a carrier sense multiple access (CSMA) with collision avoidance or collision detection. As another example, time division multiple access may be used that such each peripheral component 56-58 is assigned at least one time slot in a given frame. As yet another example, the arbitration module 40 may poll (e.g., send access queries) the peripheral components 56-58 regarding access to the processing core 16. Other examples include round robin, token passing, and/or other scheduling techniques.

The arbitration module 40, which may be a separate processing device from the processing core 16 or included therein, arbitrates the execution of the processing requests of the peripheral components 56-58 by the processing core 16. Such arbitration analyzes the work load of the processing core 12, the nature of the processing request (e.g., high priority interrupt, interrupt, low priority interrupt, service request, etc.), the identity of the peripheral component making the request, and a hierarchy scheme (e.g., certain requests have a higher priority than others, and/or other prioritization methods). Based on these factors, the arbitration module 40 prioritizes the request with pending requests and exchanges with the main memory 14. For example, a keyboard has a relatively low data rate, but it needs to be processed in real time. As such, requests from the keyboard will be prioritized such that inputs from the keyboard are processed, with respect to the user, in real-time. In general, the arbitration module provides the short-term, mid-term and/or long-term scheduler functions for the processing core 16.

In an embodiment, the MMW transceivers 42 of the processing module 14 and the MMW transceivers 64-66 of the peripheral components 56-58 may incorporate an orthogonal frequency division multiplexing (OFDM) channel usage scheme. In this instance, the upstream request (e.g., from the peripheral component to the processing module) may utilize a first OFDM scheme and the downstream response (e.g., from the peripheral component to the processing module) may utilize a second OFDM scheme. Each of the first and second OFDM may be dynamic to adjust channel usage based on the amount of bits being conveyed. For example, if the upstream request is for an interrupt and does not include an operand or any other data, it is desirous to limit the duration of the channel utilization for this request. For instance, the duration of the packet is set to a minimal value. Conversely, if the request includes data, the duration of the packet is to a larger value. In an embodiment, accessing channel C may be done similarly to accessing a channel in an IEEE 802.11 WLAN, where the processing module 12 functions as the access point and the peripheral components 56-58 function as the stations.

In another embodiment, the arbitration module 40 may allocate sub-carriers of an OFDM frame to one or more of the peripheral components 56-58 such that the processing core 16 can provide one or more responses within a given frame. For example, if a frame includes 48 data sub-carriers, any combination of the 48 can be provided to the peripheral components 56-58 depending on the size and priority of the response. As such, one peripheral component 56-58 could be assigned 12 sub-carriers while another is assigned 36 sub-carriers. In this instance, the preamble would include an indication of the sub-carriers assignments such that the MMW transceivers 64-66 of the peripheral components can determine which, if any, of the sub-carriers are for their associated peripheral component core 60-62 (e.g., the interface circuitry to interface with the corresponding peripheral component).

Within the main memory 14, the memory controller 44 controls writing to and reading from memory 20. The memory controller 44 may receive a read request or a write request from the processing module 12, the graphics interface module 50, and/or the peripheral components 56-58 may issue the memory access request and/or receive the response. The granting of read requests and write requests may be in accordance with the memory access scheduling scheme and the type of memory. For example, the memory 20 may be double data rate memory, dual channel memory, and/or fully buffered memory, which allows for multiple read requests and/or write requests to be processed concurrently. The memory access scheduling scheme may use a hierarchical approach where the processing module 12 has highest priority, the graphics interface module 50 has the next highest priority level, and then the peripheral components 56-58.

The graphics interface module 50 includes a graphics interface core 52 and a graphics interface MMW transceiver 54, which may implemented similarly to MMW transceivers 18 and 22. The graphics interface core 52, which may include an integrated graphics controller or circuitry to interface with one or more graphics cards, provides display data (e.g., video graphics, video, text, etc.) to one or more displays. The graphics interface MMW transceiver 54 provides a communication link to MEM MMW transceiver 48 for conveying graphics data read and write requests from memory 20. As shown, the MMW transceivers 54 and 48 may use a separate channel (e.g., channel_B) from the other wireless communication paths to the main memory 14 and/or the processing module 12.

Each of the peripheral components 56-58 includes a peripheral component core 60-62 and a peripheral component MMW transceiver 64-66, which may implemented similarly to MMW transceivers 18 and 22. The peripheral component core 60-62, which may include circuitry to interface with, or circuitry to implement, one or more of the peripheral components mentioned above, conveys input/output data (e.g., mouse commands, keyboard entries, Flash memory reads/writes, etc.) with the memory 20. The peripheral component MMW transceiver 64-66 provides a communication link to MEM MMW transceiver 46 for conveying I/O data read and write requests from memory 20. As shown, the MMW transceivers 64-66 and 46 may use a separate channel (e.g., channel_D) from the other wireless communication paths to the main memory 14 and/or the processing module 12.

The memory controller 44 may further function to arbitrate the memory requests from the peripheral components 56-58. Such arbitration analyzes the work load of the memory 20, the nature of the memory request (e.g., read, write, data amount, etc.), the identity of the peripheral component making the request, and a hierarchy scheme (e.g., certain requests have a higher priority than others, and/or other prioritization methods). Based on these factors, the memory controller 44 prioritizes the request with pending requests. In an OFDM implementation, the memory controller 44 may allocate sub-carriers of an OFDM frame to one or more of the peripheral components such that more than one request may be provided to the main memory 14 within the given frame.

FIG. 4 is a diagram of an example of channel assignments within a frequency band. In this example, the frequency band is divided into four equal width channels (A-D). If the frequency band is 57-66 GHz, then each channel may be 2.16 GHz in width, centered at 58.08 GHz, 60.36 GHz, 62.64 GHz, and 64.92 GHz with 0.12 GHz channel spacing. If the circuit 10 is implemented in a shielded and confined space, other frequency bands may be used to increase the number of channels. Alternatively, the frequency band may be divided into more than four channels.

FIG. 5 is a diagram of another example of channel assignments within a frequency band. In this example, the frequency band is divided into four non-equal width channels. As shown, channel A has a greater width than the other channels and channel B has a greater width than channels C and D. With reference to FIG. 3, channel A is used to support the wireless link between the processing module 12 and the main memory 14, which may have the highest priority data requirements of the various wireless connections in circuit 10. The wireless link between the graphics interface module 50 and the main memory 14 may have the next highest priority data requirement, and the peripheral components 56-58 to the processing module 12 or the main memory 14 will have the lowest priority data requirement.

Figure 6:
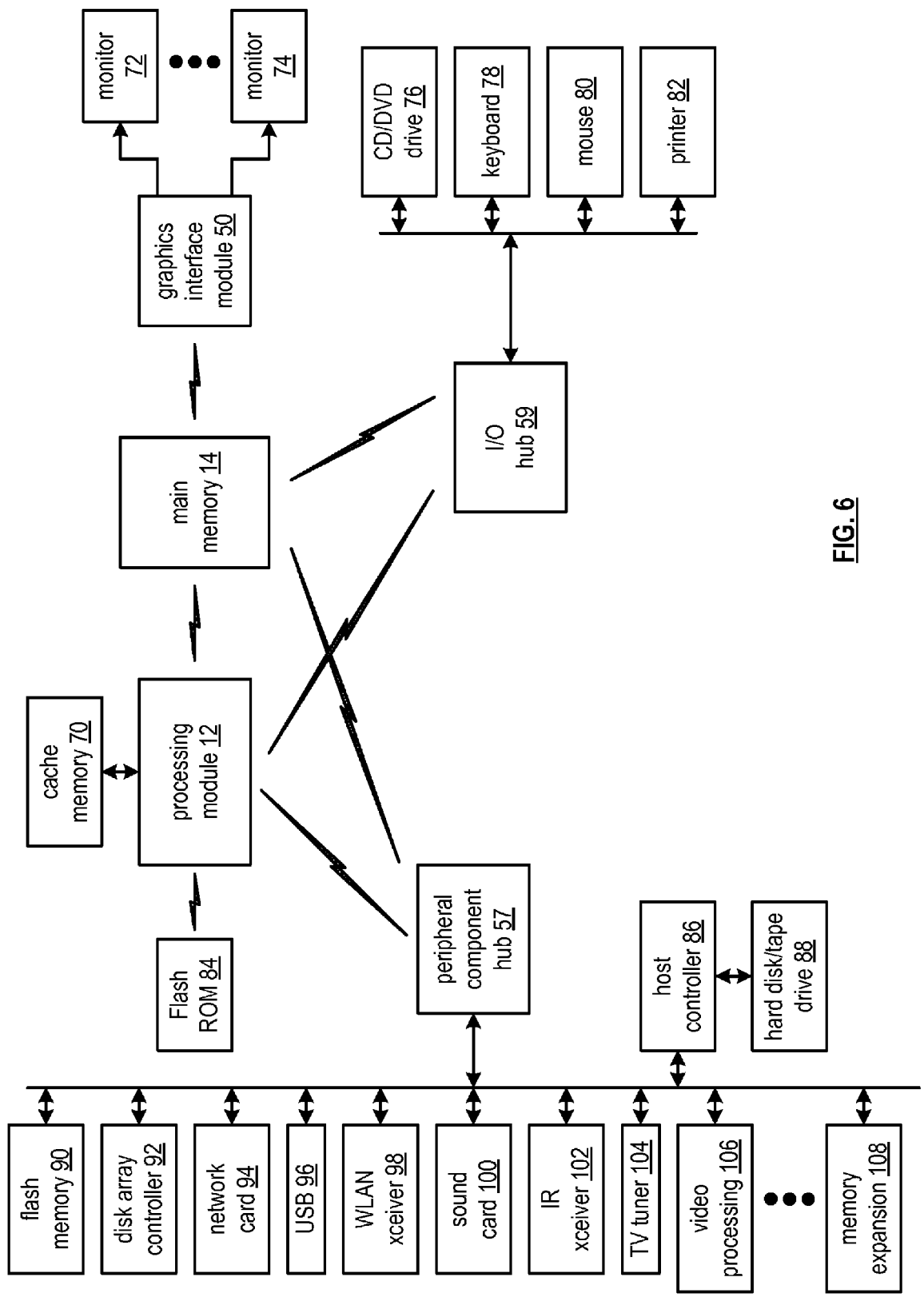
FIG. 6 is a schematic block diagram of an embodiment of a circuit in accordance with the present invention.

FIG. 6 is a schematic block diagram of an embodiment of a circuit that includes the processing module 12, the main memory 14, the graphics interface module 50, and the peripheral component hubs 57 & 59. The graphics interface module 50 is coupled to a plurality of monitors 72-74. The input/output (I/O) component hub 59 functions as an input/output (I/O) interface for a plurality of I/O devices 76-82. The peripheral component hub 57 functions as a component interface for a plurality of components 86-108. In an alternate embodiment, one or both of the hubs 57 and 59 may be omitted and each of the components coupled thereto (e.g., components 76-82 and components 86-108) may include one or more MMW transceivers to communication with the processing module 12 and/or the main memory 14

The circuit may be with a central integrated circuit (IC) including the processing module 12, the main memory 14, the graphics interface module 50, and the hubs 57 & 59 with the components 72-74, 76-82, and 86-108 being separate devices and/or integrated circuits. Alternatively, the central circuitry may be implemented via a plurality of ICs: one for the processing module 12, one for the main memory 14, one for the graphics interface module 50, and one each for the peripheral components 56-58. As yet another alternative, the central circuitry may include a few ICs, where each IC includes one or more of the modules 12, 14, 50, and 56-58.

In operation, the processing module 12 communicates instructions and/or data with the main memory 14 and the graphics interface module 50 communicates graphics data with the main memory 14 as previously discussed. The peripheral component hub 56 provides a wireless link between the plurality of data-based peripheral components 86-108 to the processing module 12 and/or to the main memory 14. In an embodiment, the peripheral component hub 57 includes a MMW transceiver that utilizes one or more channels to communicate with the processing module 12 and the main memory 14. In another embodiment, the peripheral component hub 57 includes two MMW transceivers: one for communicating with the processing module 12 and the other for communicating with the main memory 14.

The peripheral component hub 57 may be coupled to the plurality of data-based peripheral components 86-108 (e.g., a host controller 86 coupled to a hard or tape disk drive 88, flash memory 90, disk array controller 92, a network card 94, a USB 96, a WLAN transceiver 98, a sound card 100, an IR transceiver 102, a TV tuner 104, a video processing interface 106, and a memory expansion card 108) via traces on a printed circuit board (PCB) or via a shared wireless link. In the latter scheme, each data-based peripheral component includes a MMW transceiver to communicate with a MMW transceiver of the hub 57. These transceivers would use a different channel than the channels used for communications between the hub 57 and the processing module 12, the hub 57 and the main memory 14, the processing module 12 and main memory 14, the main memory 14 and the graphics interface module 50, the I/O hub 59 and the processing module 12, the I/O hub 59 and the main memory 14, and between the I/O hub 59 and the I/O based peripheral devices 76-82.

The peripheral component hub 57 arbitrates the data-based peripheral components access to the processing module 12 and/or to the main memory 14. Such arbitration analyzes the work load of the processing core 12 and/or main memory 14, the nature of the request (e.g., high priority processing request, high priority memory request, etc.), the identity of the peripheral component making the request, and a hierarchy scheme (e.g., certain requests have a higher priority than others, and/or other prioritization methods). In an OFDM implementation, the hub 57 may allocate sub-carriers of an OFDM frame to one or more of the peripheral components 86-108 such that more than one request may be provided to the processing module 12 and/or the main memory 14 within the given frame.

The I/O hub 59 is coupled to a plurality of I/O peripheral components (e.g., a CD/DVD drive 76, a keyboard 78, a mouse 80, a printer 82, etc.) via traces on a printed circuit board (PCB) or via a shared wireless link. In the latter scheme, each I/O peripheral component includes a MMW transceiver to communicate with a MMW transceiver of the hub 59. These transceivers would use a different channel than the channels used for communications between the hub 59 and the processing module 12, the hub 59 and the main memory 14, the processing module 12 and main memory 14, the main memory 14 and the graphics interface module 50, the peripheral component hub 57 and the processing module 12, the hub 57 and the main memory 14, and between the hub 57 and the data-based peripheral devices 86-108.

The I/O hub 59 arbitrates the I/O peripheral components access to the processing module 12 and/or to the main memory 14. Such arbitration analyzes the work load of the processing core 12 and/or main memory 14, the nature of the request (e.g., high priority processing request, high priority memory request, etc.), the identity of the peripheral component making the request, and a hierarchy scheme (e.g., certain requests have a higher priority than others, and/or other prioritization methods). In an OFDM implementation, the hub 59 may allocate sub-carriers of an OFDM frame to one or more of the peripheral components 76-82 such that more than one request may be provided to the processing module 12 and/or the main memory 14 within the given frame.

The circuit further includes a flash ROM (read only memory) 84, which stores the BIOS (Basic Input Output System) for the circuit. In an embodiment, the flash ROM 84 includes a MMW transceiver such that the processing module 12 can retrieve the BIOS and start the boot up of the circuit. Since this wireless link is used during start up, it may share a channel with one of the other wireless links (e.g., between the data-based peripheral components 86-18 and hub 57. etc.) or have its own dedicated wireless link.

Figure 7:
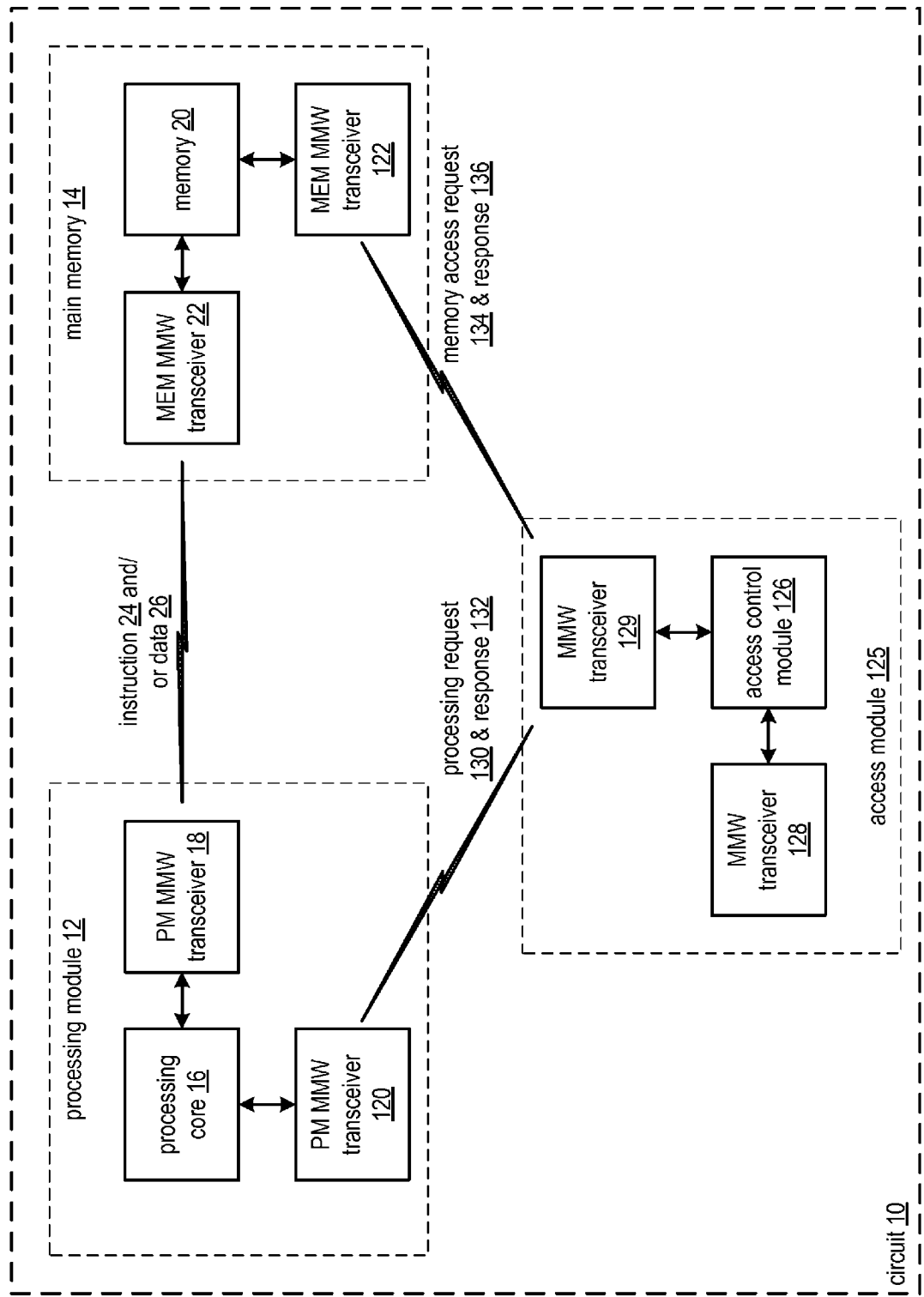
FIG. 7 is a schematic block diagram of another embodiment of an integrated circuit in accordance with the present invention.

FIG. 7 is a schematic block diagram of another embodiment of a circuit 10 that includes the processing module 12, the main memory 14, and an access module 125. The circuit 10 may be implemented as single integrated circuit (IC) including the processing module 12, the main memory 14, and the access module 125. Alternatively, the circuit may be implemented as three ICs: one for the processing module 12, a second for the main memory 14, and a third for the access module 125. In another alternative, the circuit may be implemented using two ICs: one containing the processing module 12 and the main memory 14 and the other containing the access module 125; one containing the processing module 12 and the access module 125 and the other containing the main memory 14; or one containing the main memory 14 and the access module 125 and the other containing the processing module 14.

The processing module 12 includes the processing core 16, the first processing module millimeter wave (MMW) transceiver 18, and a second processing module MMW transceiver 120. The main memory 14 includes the memory 20, the first memory MMW transceiver 22, and a second memory MMW transceiver 122. The access module 125 includes a first MMW transceiver 128, a second MMW transceiver 129, and an access control module 126. The processing core 16 and the memory 20 exchange instructions 24 and/or data 26 using a first channel of a plurality of channels as previously discussed.

The access module 125 receives, via the first access control module MMW transceiver 128 using a second channel of the plurality of channels, a processing request 130 (e.g., interrupt, service request, etc.) or a memory request 134 (e.g., read, write, etc.). The access module 125 conveys the processing request 130 to the processing core 16 via the second access control module MMW transceiver 129 and the second processing module MMW transceiver 120. The access module 125 conveys the memory access request 134 to the memory 20 via the second access control module MMW transceiver 129 and the second memory MMW transceiver 122. Note that the MMW transceivers 120, 122, 128, & 129 may be implemented similarly to MMW transceivers 18 and 22 as previously discussed.

If the processing request 130 requires a response 132, the processing core 16 provides the response 132 to the access module 125 via the PM MMW transceiver 120 and the second MMW transceiver 129 of the access module 125. Similarly, if the memory request 134 requires a response, the memory 20 provides the response 136 via the MEM MMW transceiver 122 and the second MMW transceiver 129 of the access module 125.

In this embodiment, the access module 125 controls the peripheral components' access to the processing core 16 and memory 20. As it receives requests, the access module 125 determines whether the request is for the processing core 16 or the main memory 20. Once the target is identified, the access module 125 arbitrates access to the processing core 16 and the memory 20, respectively. Arbitration for accessing the processing core 16 includes analyzing the work load of the processing core 16, the nature of the request (e.g., high priority processing request, high priority memory request, etc.), the identity of the peripheral component making the request, and a hierarchy scheme (e.g., certain requests have a higher priority than others, and/or other prioritization methods). Based on these factors, the access module 125 prioritizes the request with pending requests. In an OFDM implementation, the access module 125 may allocate sub-carriers of an OFDM frame to one or more of the peripheral components such that more than one request may be provided to the processing module 12 within the given frame.

Arbitration for accessing the memory 20 includes analyzing the work load of the memory 20, the nature of the memory request (e.g., read, write, data amount, etc.), the identity of the peripheral component making the request, and a hierarchy scheme (e.g., certain requests have a higher priority than others, and/or other prioritization methods). Based on these factors, the access module 125 prioritizes the request with pending requests. In an OFDM implementation, the access module 125 may allocate sub-carriers of an OFDM frame to one or more of the peripheral components such that more than one request may be provided to the main memory 14 within the given frame.

Figure 8:
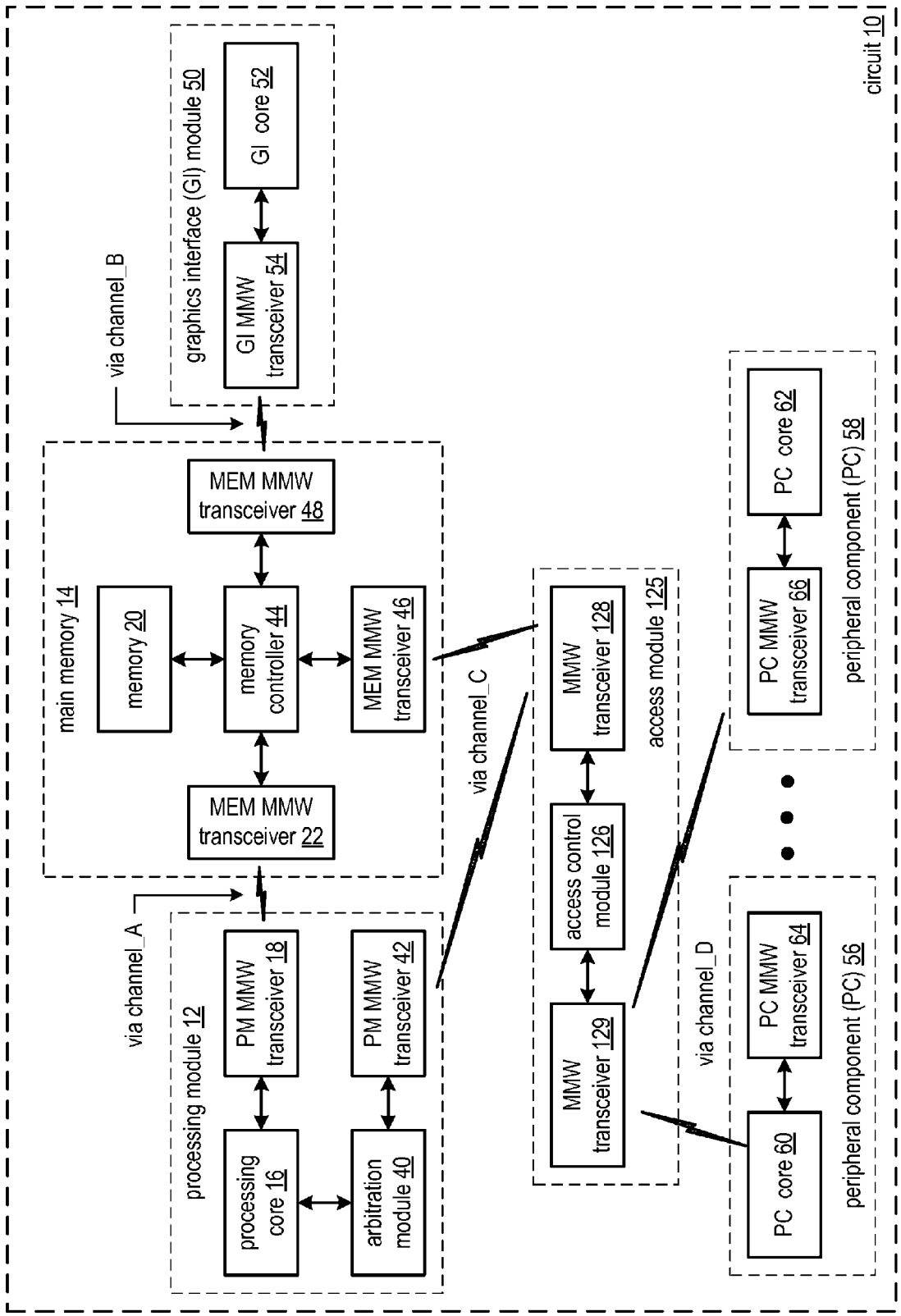
FIG. 8 is a schematic block diagram of another embodiment of an integrated circuit in accordance with the present invention.

FIG. 8 is a schematic block diagram of another embodiment of a circuit 10 that includes the processing module 12 the main memory 14, a graphics interface (GI) module 50, the access module 125, and a plurality of peripheral components (PC) modules 56-58. The circuit 10 may be implemented as single integrated circuit (IC) including the processing module 12, the main memory 14, the graphics interface module 50, the access module 125, and the peripheral components 56-58. Alternatively, the circuit 10 may be implemented via a plurality of ICs: one for the processing module 12, one for the main memory 14, one for the graphics interface module 50, one for the access module 125, and one each for the peripheral components 56-58. As yet another alternative, the circuit 10 may include a few ICs, where each IC includes one or more of the modules 12, 14, 50, 56-58, and 125.

The processing module 12 includes the processing core 16, first and second processing module (PM) millimeter wave (MMW) transceivers 18 and 42, and an arbitration module 40. The main memory 14 includes the memory 20, first, second, and third MEM MMW transceivers 22, 48, & 48, and a memory controller 44. The graphics interface module 50 includes a graphics interface core 52 and a graphics interface MMW transceiver 54. Each of the peripheral components 56-58 includes a peripheral component MMW transceiver 64-66 and a peripheral component core 60-62. The access module 125 includes the access control module 126, the first access control MMW transceiver 128, and the second access control MMW transceiver 129.

The processing module 12 and the main memory 14 exchange instructions 24 and/or data 26 as previously discussed via one or more channels of a plurality of channels (e.g., channel A of channels A-D). In addition, the processing module 12 may convey instructions (e.g., input/output requests, interrupts, service requests, etc.) and/or data with one or more of the peripheral components 56-58 via the access module 125. The peripheral components 56-58 may be one or more of input/output interfaces coupled to one or more of a keyboard, a keypad, a touch screen, a mouse, a printer, a disk drive, etc. In addition or alternatively, the peripheral components 56-58 may be a hard disk interface, a flash memory interface, a disk array controller, a network card interface, a universal serial bus (USB) interface, a wireless local area network (WLAN) interface, a sound card interface, an infrared (IR) transceiver interface, a television tuner interface, a video processing interface, and/or a memory expansion interface.

In this instance, the processing module 12 conveys the instructions and/or data via channel C with the access module 125. The access module 125 conveys the instructions and/or data to one or more of the peripheral components 56-58 via another channel (e.g., channel D). As such, the peripheral components are sharing channel D, which may be done in a variety of ways. For example, the peripheral component MMW transceivers 64-66 may utilize a carrier sense multiple access (CSMA) with collision avoidance or collision detection. As another example, time division multiple access may be used that such each peripheral component 56-58 is assigned at least one time slot in a given frame. As yet another example, the access control module 126 may poll (e.g., send access queries) the peripheral components 56-58 regarding access to the processing core 16. Other examples include round robin, token passing, and/or other scheduling techniques.

The main memory 14 exchanges graphics data with the graphics interface module 50 as previously described. In addition, the memory 20 may convey data (e.g., data read request, data write request, etc.) with one or more of the peripheral components 56-58 via the access module 125. In this instance, the main memory 14 conveys the data via channel C with the access module 125. The access module 125 conveys the data to one or more of the peripheral components 56-58 via another channel (e.g., channel D).

In this example, the processing module 12 and the main memory are sharing channel C for communication with the access module 125, which may be done in a variety of ways. For example, the MMW transceivers 42 and 46 may utilize a carrier sense multiple access (CSMA) with collision avoidance or collision detection. As another example, time division multiple access may be used that such the processing module 12 and the main memory 14 assigned at least one time slot in a given frame. As yet another example, the access control module 126 may poll (e.g., send access queries) the peripheral components 56-58 regarding access to the processing core 16 and/or the main memory 14 and allocate the channel based on need. Other examples include round robin, token passing, and/or other scheduling techniques.

While the processing module 12 and the main memory 14 are shown sharing channel C, each could have a dedicate channel with respect to the access module 125. In this instance, the access module 125 would include another MMW transceiver.

Figure 9:
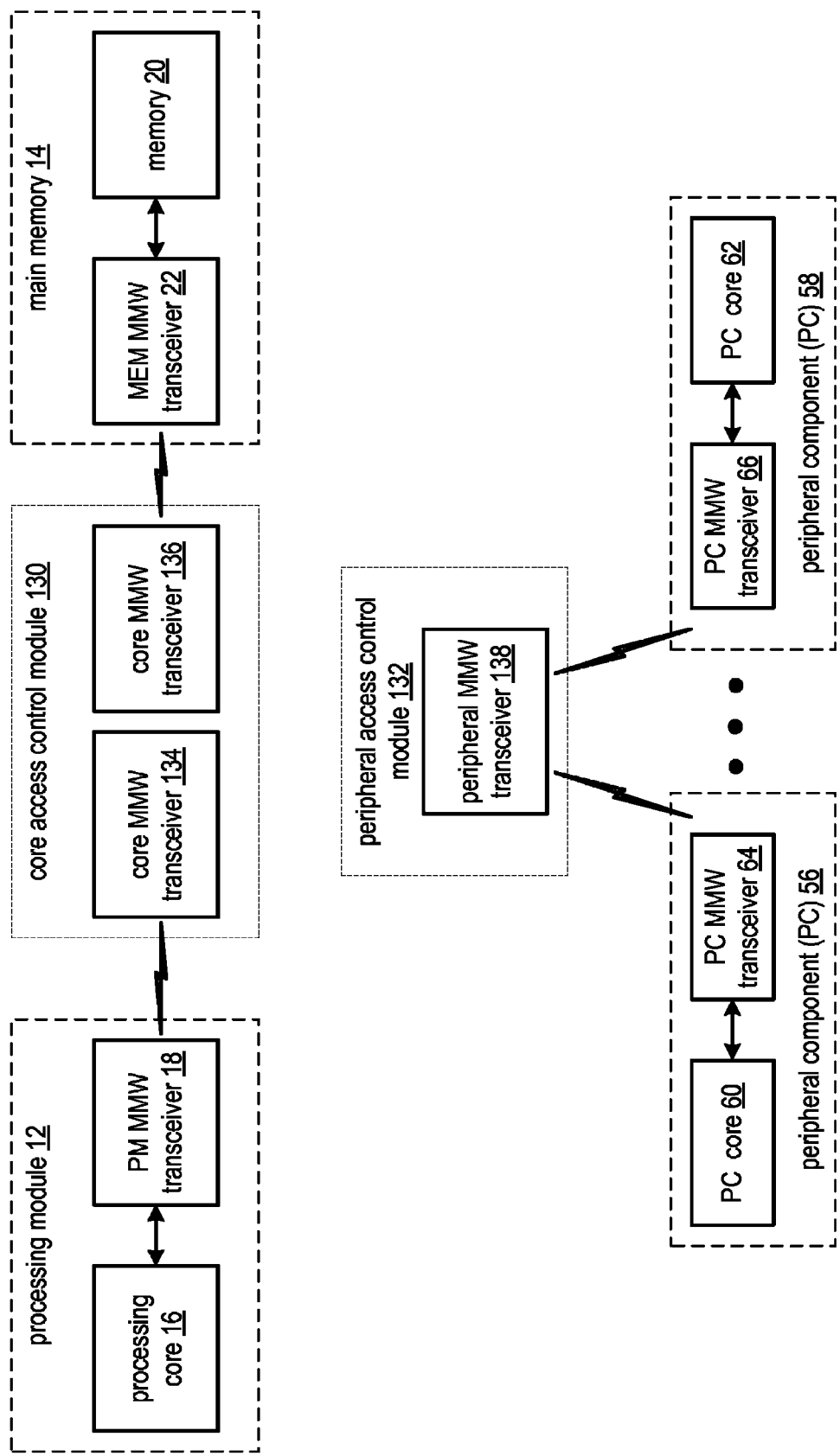
FIG. 9 is a schematic block diagram of another embodiment of a circuit in accordance with the present invention.

FIG. 9 is a schematic block diagram of another embodiment of a circuit 10 that includes a core access control module 130 and a peripheral access control module 132. The core access control module 130 provides wireless coupling between the processing module 12 and the main memory 14. The peripheral access control module 132 provides wireless coupling to a plurality of peripheral components 56 and 58. The circuit 10 may be implemented as single IC including the core access control module 130 and the peripheral access control module 132. Alternatively, the circuit 10 may be implemented as two ICs: one for the core access control module 130 and another for the peripheral access control module 132. The processing module 12 and the main memory 14 may be on the same IC as the core access control module 130 or on separate ICs.

In an embodiment, the core access control module 130 includes a first core millimeter wave (MMW) transceiver 136 operable to convey a memory message (e.g., read, write, delete, etc.) with main memory 14 and a second core MMW transceiver 134 operable to convey a processing message (e.g., interrupt, instructions, data, etc.) with a processing module 12. The wireless communication between the core access control module 130 and the processing module 12 may use a first channel of a plurality of channels and the wireless communication between the core access control module 130 and the main memory 14 may use a second channel of the plurality of channels. As shown, the processing module 12 includes the processing core 16 and the PM MMW transceiver 18 and the main memory 14 includes the memory 20 and the MEM MMW transceiver 22.

The peripheral access control module 132 is coupled (e.g., wired or wireless) to the core access control module 130 and includes a peripheral access MMW transceiver 138 operable to convey a peripheral message (e.g., access request to the processing core, access request to the memory 20, a response from the processing core 14, a response from the memory 20, etc.) with one of a plurality of peripheral components 56-58. Each of the plurality of peripheral components 56-58 includes a peripheral core 60-62 and a peripheral component MMW transceiver 64-66.

In this embodiment, the core access control module 130 controls access to the processing core 16 and access to the memory 20, regardless of the requesting component. In addition, the peripheral component control module 132 coordinates requests and responses from/to the peripheral components 56-58 and coordinates with the core access control module 130 to convey the requests and/or responses to/from the processing core 16 and/or memory 20.

Figure 10:
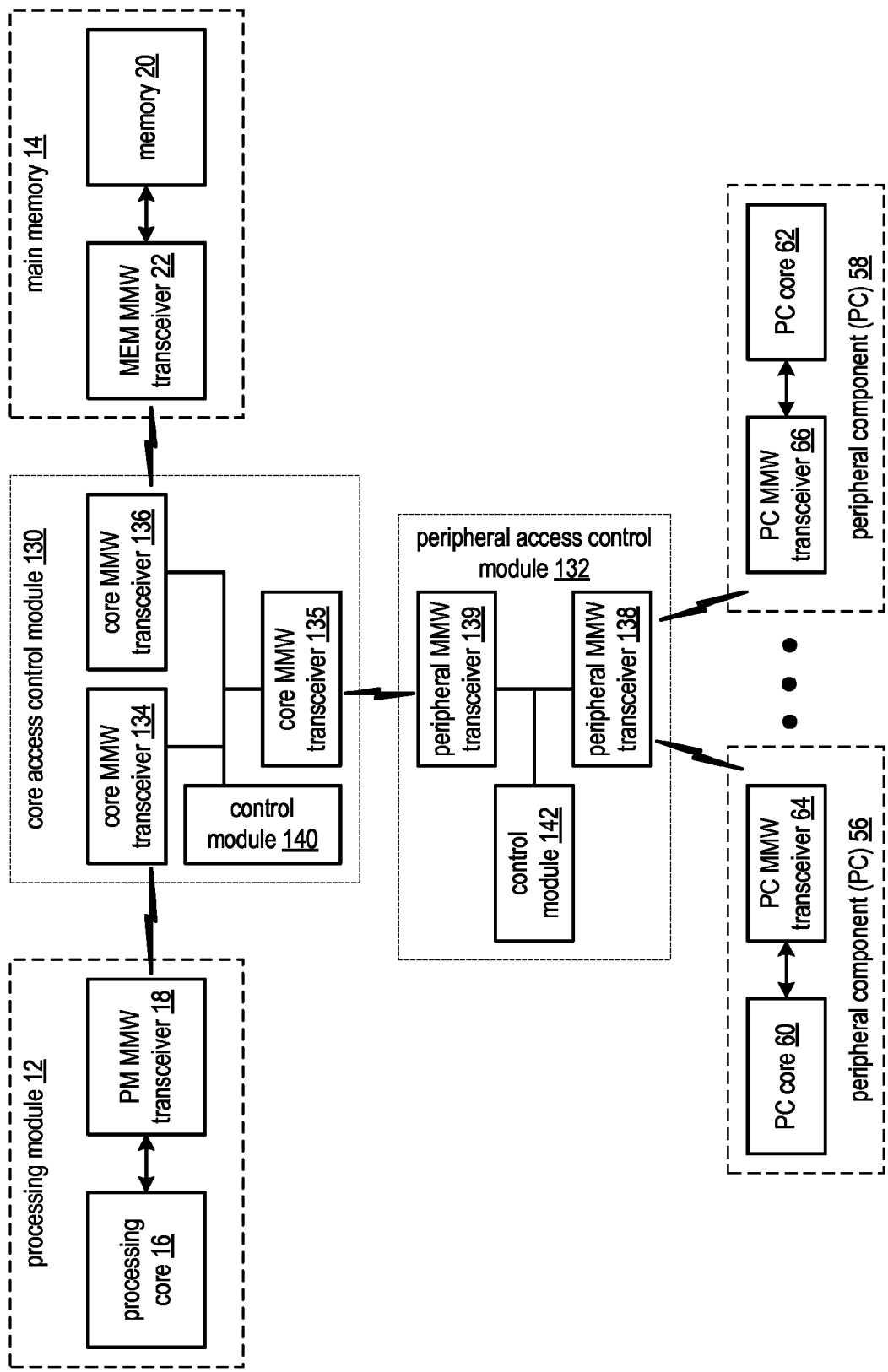
FIG. 10 is a schematic block diagram of another embodiment of a circuit in accordance with the present invention.

FIG. 10 is a schematic block diagram of another embodiment of a circuit 1010 that includes a core access control module 130 and a peripheral access control module 132. The core access control module 130 provides wireless coupling between the processing module 12 and the main memory 14. The peripheral access control module 132 provides wireless coupling to a plurality of peripheral components 56 and 58. The circuit 10 may be implemented as single IC including the core access control module 130 and the peripheral access control module 132. Alternatively, the circuit 10 may be implemented as two ICs: one for the core access control module 130 and another for the peripheral access control module 132. The processing module 12 and the main memory 14 may be on the same IC as the core access control module 130 or on separate ICs.

In this embodiment, the core access control module 130 and the peripheral access control module 132 communicate wirelessly via core MMW transceiver 135 and peripheral MMW transceiver 139. These transceivers may use a different channel than the channels used for communication between the core access control module 130 and the processing module 12, the core access control module 130 and the main memory 14, and between the peripheral access control module 132 and the peripheral components 56-58.

As shown, the core access control module 130 further includes a control module 140 that is operable to coordinate the conveying of the memory message with main memory 14 and the conveying of the processing message with the processing module 12. Coordination for accessing the processing core 16 includes analyzing the work load of the processing core 16, the nature of the request (e.g., high priority processing request, high priority memory request, etc.), the identity of the requesting device (e.g., a peripheral component, main memory 14, etc.), and a hierarchy scheme (e.g., certain requests have a higher priority than others, and/or other prioritization methods). Based on these factors, the core access control module 130 prioritizes the request/response with pending requests/responses. In an OFDM implementation, the core access control module 130 may allocate sub-carriers of an OFDM frame to one or more of the requesting devices such that more than one request and/or response may be provided to/from the processing module 12 within the given frame.

Coordination for accessing the memory 20 includes analyzing the work load of the memory 20, the nature of the memory request (e.g., read, write, data amount, etc.), the identity of the device making the request (e.g., a peripheral component, the processing module 12, etc.), and a hierarchy scheme (e.g., certain requests have a higher priority than others, and/or other prioritization methods). Based on these factors, the core access control module 130 prioritizes the request/response with pending requests/responses. In an OFDM implementation, the core access control module 130 may allocate sub-carriers of an OFDM frame to one or more of the requesting devices such that more than one request/response may be provided to/from the main memory 14 within the given frame.

The peripheral access control module 132 includes a control module 142 that is operable to coordinate conveying a plurality of peripheral message (e.g., processing request messages, processing response messages, memory access request messages, memory response messages, etc.) with the plurality of peripheral components. Such coordination includes analyzing a load of the peripheral components 56-58, the nature of the request (e.g., read, write, data amount, interrupt, service request, etc.) or response, the identity of the device making the request, and a hierarchy scheme (e.g., certain requests have a higher priority than others, and/or other prioritization methods). Based on these factors, the peripheral access control module 132 prioritizes the request/response with pending requests/responses and provides them to, or receives them from, the core access control module 130 accordingly. In an OFDM implementation, the peripheral access control module 130 may allocate sub-carriers of an OFDM frame to one or more of the peripheral components such that more than one request/response may be provided to/from the core access control module 130 within the given frame.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A circuit comprising:
   a processing module including:
   a processing core; and
   a first processing module millimeter wave (MMW) transceiver coupled to the processing core;
   a second processing module MMW transceiver for processing requests from a plurality of peripheral components;
   a main memory including:
   memory; and
   a first memory MMW transceiver coupled to the memory, wherein at least one of an instruction and data is conveyed between the processing core and the memory via the first processing module MMW transceiver and the first memory MMW transceiver using a first channel of a plurality of channels; and
   a second memory MMW transceiver for processing memory requests from the plurality of peripheral components; and
   the plurality of peripheral components, wherein each of the plurality of peripheral components comprises a peripheral MMW transceiver such that the peripheral MMW transceiver for each one of the plurality of peripheral components conveys the processing requests to the processing core via the second processing module MMW transceiver using a second channel of the plurality of channels and conveys the memory requests to the main memory via the second memory MMW transceiver using a third channel of the plurality of channels.

2. The circuit of claim 1 further comprises:
   the first processing module MMW transceiver including a transmitter section and a receiver section; and
   the first memory MWW transceiver section including a transmitter section and a receiver section, wherein the transmitter section of the first processing module MMW transceiver and the receiver section of the first memory MMW transceiver section use the first channel of a plurality of channels for conveying the at least one of an instruction and data from the processing core to the memory and wherein the receiver section of the first processing module MMW transceiver and the transmitter section of the first memory MMW transceiver section use a fourth channel of the plurality of channels for conveying the at least one of an instruction and data from the memory to the processing core.

3. The circuit of claim 1, wherein the processing module further comprises:
   an arbitration module coupled to the processing core and the second processing module MMW transceiver, wherein the arbitration module arbitrates the execution of the processing requests by the processing core.

4. The circuit of claim 3, wherein each of the plurality of peripheral components comprises a peripheral component core.

5. The circuit of claim 3, wherein the arbitration module functions to arbitrates the execution of the processing requests by at least one of:
   coordinating a time division multiple access of the second channel among the plurality of peripheral components;
   coordinating access of the plurality of peripheral devices to the second channel using an orthogonal frequency division multiplexing channel usage scheme;
   transmitting access queries to the plurality of peripheral components and arbitrating based on corresponding responses;
   coordinating a carrier sense multiple access with collision avoidance protocol; and
   coordinating a hierarchy scheme among the plurality of peripheral components to access the second channel.

6. The circuit of claim 1, wherein
   the second channel of the plurality of channels includes the third channel of the plurality of channels.

7. The circuit of claim 1 further comprises:
   a graphics interface module including:
   a graphics interface core; and
   a graphics MMW transceiver;
   wherein the main memory further includes:
   a third memory MMW transceiver, wherein graphics data is conveyed between the graphics interface core and main memory via the third MMW transceiver and the graphics MMW transceiver using a fourth channel of the plurality of channels.

8. A circuit comprises:
   a processing module including:
   a processing core;
   a first processing module millimeter wave (MMW) transceiver coupled to the processing core; and
   a second processing module MMW transceiver coupled to the processing core;

a main memory including:
  memory;
  a first memory MMW transceiver coupled to the memory, wherein at least one of an instruction and data is conveyed between the processing core and the memory via the first processing module MMW transceiver and the first memory MMW transceiver using a first channel of a plurality of channels; and
  a second memory MMW transceiver coupled to the memory; and
an access module including:
  a first access control module MMW transceiver coupled to the access control module; and
  a second access control module MMW transceiver coupled to the access control module, wherein a memory access request or a processing request is received via the first access control module MMW transceiver using a second channel of the plurality of channels, wherein the access module conveys the processing request to the processing core via the second access control module MMW transceiver and the second processing module MMW transceiver, and wherein the access module conveys the memory access request to the memory via the second access control module MMW transceiver and the second memory MMW transceiver.

9. The circuit of claim 8 further comprises:
the first processing module MMW transceiver including a transmitter section and a receiver section; and
the first memory MWW transceiver section including a transmitter section and a receiver section, wherein the transmitter section of the first processing module MMW transceiver and the receiver section of the first memory MMW transceiver section use the first channel for conveying the at least one of an instruction and data from the processing core to the memory and wherein the receiver section of the first processing module MMW transceiver and the transmitter section of the first memory MMW transceiver section use a fourth channel of the plurality of channels for conveying the at least one of an instruction and data from the memory to the processing core.

10. The circuit of claim 8 further comprises:
a plurality of peripheral components, wherein each of the plurality of peripheral components includes:
a peripheral component core; and
a peripheral MMW transceiver, wherein the memory access request or the processing request and a corresponding response are conveyed between the peripheral component core and the access control module via the second access control module MMW transceiver and the peripheral MMW transceiver using the second channel.

11. The circuit of claim 8 further comprises:
a graphics interface module including:
  a graphics interface core; and
  a graphics MMW transceiver;
wherein the main memory further includes:
a third memory MMW transceiver, wherein graphics data is conveyed between the graphics interface core and main memory via the third MMW transceiver and the graphics MMW transceiver using a fourth channel of the plurality of channels.

12. The circuit of claim 8, wherein the access control module functions to:
convey the processing request to the processing core via the second access control module MMW transceiver and the second processing module MMW transceiver using a third channel of the plurality of channels; and
convey the memory access request to memory via the second access control module MMW transceiver and the second memory MMW transceiver using the third channel.

13. The circuit of claim 8, wherein the second access control module MMW transceiver comprises:
a memory MMW transceiver that conveys the memory access request to the second memory MMW transceiver using a third channel of the plurality of channels; and
a processing module transceiver that conveys the processing request the second processing module MMW transceiver using a fourth channel of the plurality of channels.

14. A circuit comprises:
a core access control module including:
  a first core millimeter wave (MMW) transceiver operable to convey a memory message with a main memory via a first memory MMW transceiver using a first channel of a plurality of channels;
  a second core MMW transceiver operable to convey a processing message with a processing module via a first processing module MMW transceiver using a second channel of a plurality of channels; and
  a third core MMW transceiver operable to communicate with a peripheral access control module using a third channel of a plurality of channels; and
a peripheral access control module, wherein the peripheral access control module includes:
  a first peripheral access MMW transceiver operable to convey a peripheral message with one of a plurality of peripheral components; and
  a second peripheral MMW transceiver that communicates with the third core MMW transceiver to couple the core access control module with the peripheral access control module.

15. The circuit of claim 14 further comprises:
the core access control module operable to provide the coupling between the peripheral access control module and the main memory and the processing module.

16. The circuit of claim 14 further comprises:
the processing module including:
  a processing core; and
  the first processing module MMW transceiver coupled to the processing core.

17. The circuit of claim 14 further comprises:
the main memory including:
  memory; and
  the first memory MMW transceiver coupled to the memory.

18. The circuit of claim 14 further comprises:
the plurality of peripheral components, wherein each of the peripheral components includes:
  a peripheral core; and
  a peripheral MMW transceiver coupled to the peripheral core, wherein the peripheral MMW transceiver conveys the peripheral message with the peripheral access MMW transceiver.

19. The circuit of claim 14, wherein the core access control module further comprises:
a control module operable to coordinate the conveying of the memory message with main memory and the conveying of the processing message with the processing module.

20. The circuit of claim 14, wherein the peripheral access control module further comprises:
a control module operable to coordinate conveying a plurality of peripheral messages with the plurality of peripheral components.

* * * * *